US011579125B2

(12) United States Patent
Denny et al.

(10) Patent No.: US 11,579,125 B2
(45) Date of Patent: Feb. 14, 2023

(54) REAL-TIME PEAK DETECTION

(71) Applicant: Waters Technologies Ireland Limited, Dublin (IE)

(72) Inventors: Richard Denny, Staffordshire (GB); Allen Caswell, Franklin, MA (US); Jose L. De Corral, Oceanside, CA (US); Marc V. Gorenstein, Needham, MA (US)

(73) Assignee: WATERS TECHNOLOGIES IRELAND LIMITED, Dublin (IE)

( * ) Notice: Subject to any disclaimer, the term of this patent is extended or adjusted under 35 U.S.C. 154(b) by 414 days.

(21) Appl. No.: 16/794,857

(22) Filed: Feb. 19, 2020

(65) Prior Publication Data

US 2020/0264141 A1    Aug. 20, 2020

Related U.S. Application Data

(60) Provisional application No. 62/808,075, filed on Feb. 20, 2019.

(51) Int. Cl.
*G01N 30/72* (2006.01)
*G01N 30/86* (2006.01)
(Continued)

(52) U.S. Cl.
CPC ..... *G01N 30/7233* (2013.01); *G01N 30/8617* (2013.01); *G01N 30/8631* (2013.01); *G01N 30/8651* (2013.01); *G01N 30/8665* (2013.01); *G01N 30/8675* (2013.01); *G01N 30/8696* (2013.01); *H01J 49/0036* (2013.01); *G01N 2030/027* (2013.01)

(58) Field of Classification Search
CPC .......... G01N 30/7233; G01N 30/8617; G01N 30/8631; G01N 30/8651; G01N 30/8665; G01N 30/8675; G01N 30/8696; G01N 2030/027; H01J 49/0036
See application file for complete search history.

(56) References Cited

U.S. PATENT DOCUMENTS

| | | | |
|---|---|---|---|
| 2003/0033091 A1* | 2/2003 | Opalsky | G16B 20/00 702/19 |
| 2013/0080073 A1* | 3/2013 | de Corral | H01J 49/0036 702/23 |
| 2013/0232474 A1* | 9/2013 | Leclair | G06F 11/3668 717/134 |

FOREIGN PATENT DOCUMENTS

| | | |
|---|---|---|
| WO | 2012116131 A1 | 8/2012 |
| WO | 2016200756 A1 | 12/2016 |

OTHER PUBLICATIONS

International Search Report and Written Opinion for International application No. PCT/IB2020/051402, dated Jun. 22, 2020, 12 pages.

* cited by examiner

*Primary Examiner* — Jennifer Wecker
*Assistant Examiner* — Michael Paul Shimek
(74) *Attorney, Agent, or Firm* — Goodwin Procter LLP

(57) ABSTRACT

Techniques for real-time or substantially real-time peak detection are described. In one embodiment, for example, logic coupled to memory may be configured to receive data from at least one analytical instrument and perform processing or analysis on the received data. Moreover, the logic may be configured to determine, via one or more GPUs or CPUs (or both), one or more peaks based on the processing or the analysis of the received data and generate peak detection data based on the detected one or more peaks in real-time or substantially real-time. Other embodiments are described.

25 Claims, 7 Drawing Sheets

(51) Int. Cl.
*H01J 49/00* (2006.01)
*G01N 30/02* (2006.01)

REAL-TIME PEAK DETECTION

CROSS-REFERENCE TO RELATED APPLICATIONS

This application claims the benefit of and priority to U.S. Provisional Patent Application No. 62/808,075, filed on Feb. 20, 2019, the entire contents of which are incorporated by reference.

TECHNICAL FIELD

Embodiments herein are generally related to real-time peak detection in mass analysis based processing, and, more particularly, to one or more real-time peak determination modules of a data acquisition system.

BACKGROUND

A mass analysis system, such as a mass spectrometry (MS) system and/or a liquid chromatography-mass spectrometry (LC-MS) system, may be capable of providing detailed characterizations of complex sample sets, including biological matrices, food and environment (F&E) materials, pharmaceutical compounds, metabolic pathway analyses, and/or the like.

To streamline the collection and storage of mass analysis related data, the mass analysis system may be coupled to a data acquisition system. For example, the data acquisition system may be a data streaming service where all mass analysis related data acquired from the mass analysis system may be continually streamed through the data acquisition system and stored in one or more connected databases.

After the mass analysis related data has been streamed and stored, post-acquisition processing may be performed on the mass analysis related data, such as peak detection, instrument calibration, drift analyses, etc. In typical cases, more than one application (or more than one type of application) may perform a specific post-acquisition processing on the data, such as peak detection. It may be possible that other various types of post-acquisition processing on the mass analysis related data may be performed based on the different types of analyses required, e.g., instrument-related analyses, user-specific analyses, application-level filtering.

While the data acquisition system provides a versatile data acquisition framework for streaming and storing raw continuum data, it is limited in that important mass analyses, like peak detection, are performed after data acquisition and not in real-time. Moreover, because numerous applications may perform specific post-acquisition processing on the mass analysis related data, the output of that specific analysis may be inconsistent and disjoined across the numerous applications. Further, the collection of raw continuum data by the data acquisition system inherently increases the need for storage space and places a great burden on the application servers, databases, and the network for post-acquisition processing.

SUMMARY

In accordance with various aspects of the described embodiments is a system that may include at least one analytical instrument, at least one first computing device connected to or comprised in the at least one analytical instrument, a data acquisition system programmatically interfaced with the at least first computing device, and at least one second computing device programmatically interfaced with the data acquisition system. The at least first computing device may include at least one memory and logic coupled to the at least one memory. The logic may be configured to receive data from the at least one analytical instrument, perform processing or analysis on the received data, determine one or more peaks based on the processing or the analysis of the received data, and generate, in real-time or substantially real-time, peak detection data based on the detected one or more peaks. The logic may be a graphics processing unit (GPU). In some embodiments, the peak detection data includes one or more peak lists. Moreover, the logic may be configured to provide or make accessible the peak detection data to one or more plug-in modules, where the one or more plug-in modules are programmatically integrated into the data acquisition system.

In accordance with various aspects of the described embodiments is a method that may include, at an instrument level, receiving data from at least one analytical instrument, performing processing or analysis on the received data, determining, via one or more graphics processing units (GPUs), one or more peaks based on the processing or the analysis of the received data, and generating, in real-time or substantially real-time, peak detection data based on the detected one or more peaks. Peak detection data may then be processed at an application level in real-time or substantially real-time with application specific filters (e.g., isotope patterns, mass sufficiency).

In accordance with various aspects of the described embodiments is a computer readable medium storing executable instructions, the executable instructions when executed by one or more processors causes the one or more processors to receive data from the at least one analytical instrument, perform processing or analysis on the received data, determine, via the one or more processors, one or more peaks based on the processing or the analysis of the received data, and generate, in real-time or substantially real-time, peak detection data based on the detected one or more peaks. In some embodiments, the one or more processors include a central processing unit (CPU) and/or a graphics processing unit (GPU).

DETAILED DESCRIPTION

Figure 1:
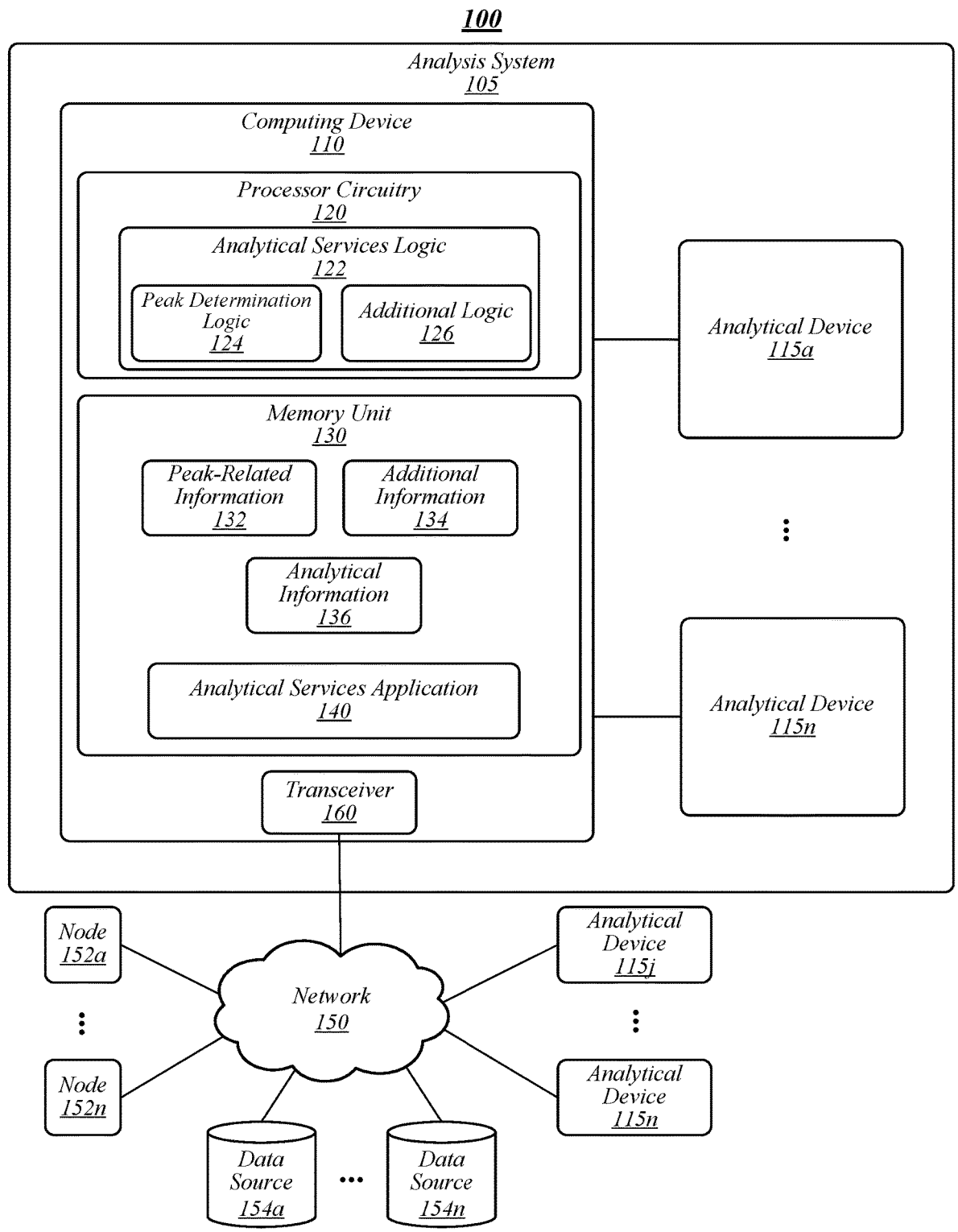
FIG. 1 illustrates a first operating environment in accordance with one or more embodiments.

Various embodiments may generally be directed toward real-time or substantially real-time peak detection in a data acquisition system. The data acquisition system may be coupled or connected to and/or programmatically interfaced with an analytical instrument or system, e.g., a mass analysis system. For example, one or more plug-in modules, e.g., an application programming interface (API), may be incorporated in the data acquisition system. In embodiments, the module may receive raw continuum data (which may be streaming in the data acquisition system), perform processing on the data, and output the processing results in a usable format, all of which may be performed in real-time or substantially real-time. The term "real-time or substantially real-time" for instance, may refer to the processing being performed in the data acquisition system prior to the data being sent to a database, or may refer to any time that is current, instantaneous, immediate, or the like, or may refer to where processing and output keep up with data acquisition rate(s), or where the throughput of a system is functionally sufficient, and/or may refer to one or more processes that are performed on-the-fly. Moreover, it may be understood that the term "peak detection" may be broad and include any suitable form of peak detection, peak determination, peak calculation, peak generation, and/or the like.

In examples, the real-time or substantially real-time processing of the raw data may include peak detection and other various processes associated with peak determination according to some embodiments including, without limitation, auto-thresholding, on-the-fly determination of chromatographic peak width, noise reduction, etc. In further examples, the output of the processing results may be configured as one or more blocks of data, one or more records of data, etc. corresponding to the performed processing. For instance, the output may include one or more lists of all of the detected peaks. Moreover, the output data may be centroided and corrected for lock mass, instrumental calibration, instrumental noise, drift, saturation, ringing, and/or the like. In certain embodiments, for example if a lock-mass correction must be interpolated to achieve sufficient accuracy, some latency may be introduced until the next lock-mass scan has been acquired and processed. In these instances, the corrected data could be provided in near real-time or could constitute a separate stream of data to one or more databases, such as database(s) 508 (as will be further described below) and/or peak list, such as peak list 414 (as will be further described below).

By implementing one or more modules, which may be hard coded or a plug-in extension, in the data acquisition system, the instrument-related processing may effectively be moved from the post-acquisition processing end (e.g., processing performed after all mass analysis related data has been streamed and stored), as described above, and pushed "into the instrument" itself, thereby allowing a user to access the results of the processing in real-time or substantially real-time via the one or more modules. Thus, the user may be able to instantaneously (or near instantaneously) obtain peak detection data, and for example, adjust the instrument on-the-fly based on, among other things, the peak detection results. Such results may then be processed by the user, e.g., on a coupled computing device configured to apply application-specific filters to the peak detection results (e.g., filtering based on an isotope model, applying a mass sufficiency filter). In examples, the computing device may also be configured to filter noise from the data and/or correct for instrument non-idealities, e.g., ringing, saturation, etc.

The embodiments and/or examples described herein may provide for technological advantages over conventional systems. In conventional systems, the real-time or substantially real-time processing of the streamed data, particularly instrument-related processing, was not possible or at least extremely difficult. Data has to be streamed and stored prior to any processing thereof, as described above. In one non-limiting example of a technological improvement, embodiments provide for real-time or substantially real-time peak detection, auto-thresholding, on-the-fly determination of chromatographic peak width, noise reduction, etc. by way of one or more modules incorporated in the data acquisition system. Real-time or substantially real-time peak detection, for example, increases the overall performance of the mass analysis system and the testing of samples since the analytical system and related instruments can be adjusted on the fly based on the peak detection results. In another non-limiting example of a technological improvement, embodiments provide for significant data reduction. For example, reducing the output data to one or more peak lists could result in the reduction of storage requirement by multiple orders of magnitude, as opposed to storing copious amounts of raw continuum data in one or more databases and/or file systems, and performing processing or analysis thereafter. In yet another non-limiting example of a technological improvement, embodiments provide for the uniformity of at least the instrument-related processing. For example, the same peak list and its corresponding properties generated by the one or more modules may be used by all of the applications performing further processing or analysis on the peak list(s), thereby providing continuity, consistency, and uniformity in the post-peak-list processing.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to manage analytical information associated with analytical device (or devices) 115*a-n*. In some embodiments, analytical device 115*a-n* may be or may include a chromatography system, a liquid chromatography (LC) system, a gas chromatography (GC) system, a mass analyzer system, a mass detector system, a mass spectrometer (MS) system, an ion mobility spectrometer (IMS) system, a high-performance liquid chromatography (HPLC) system, a ultra-performance liquid chromatography (UPLC®) system, a ultra-high performance liquid chromatography (UHPLC) system, an ultraviolet (UV) detector, a visible light detector, a solid-phase extraction system, a sample preparation system, a capillary electrophoresis instrument, combinations thereof, components thereof, variations thereof, and/or the like. Although LC, MS, and LC-MS are used in examples in this detailed description, embodiments are not so limited, as other analytical instruments capable of operating according to some embodiments are contemplated herein.

In some embodiments, analytical device 115a-n may operate to perform an analysis and generate analytical information 136. In various embodiments, analytical information 136 may include information, data, files, charts, graphs, images, and/or the like generated by an analytical instrument as a result of performing an analysis method. For example, for an LC-MS system, analytical device 115a-n may separate a sample and perform mass analysis on the separated sample according to a specified method to generate analytical information 136 that may include raw or unprocessed data, chromatograms, spectra, peak lists, mass values, retention time values, concentration values, compound identification information, and/or the like. In various embodiments, analytical information 136 may include information resulting from a performance assessment process, such as a system suitability test.

In various embodiments, analysis system 105 may include computing device 110 communicatively coupled to analytical device 115a-n or otherwise configured to receive and store analytical information 136 associated with analytical device 115. For example, analytical device 115a-n may operate to provide analytical information 136 directly to computing device 110 and/or to a location on a network 150 (for instance, a cloud computing environment) accessible to computing device 110. In some embodiments, computing device 110 may be operative to control, monitor, manage, or otherwise process various operational functions of analytical device 115a-n. In some embodiments, computing device 110 may be operative to provide analytical information 136 to a location on a network 150 through a secure or authenticated connection. In some embodiments, computing device 110 may be or may include a stand-alone computing device, such as a personal computer (PC), server, tablet computing device, cloud computing device, and/or the like. In various embodiments, computing device 110 may be or may include a controller or control system integrated into analytical device 115a-n to control operational aspects thereof.

As shown in FIG. 1, computing device 110 may include processing circuitry 120, a memory unit 130, and a transceiver 160. Processing circuitry 120 may be communicatively coupled to memory unit 130 and/or transceiver 160.

Processing circuitry 120 may include and/or may access various logic for performing processes according to some embodiments. For instance, processing circuitry 120 may include and/or may access analytical services logic 122, peak determination logic 124, and/or additional logic 126. Processing circuitry and/or analytical services logic 122, peak determination logic 124, and/or additional logic 126 (e.g., additional and/or alternative logic associated with various aspects of peak determination including, without limitation, auto-thresholding, on-the-fly determination of chromatographic peak width, noise reduction, etc.), or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

Although analytical services logic 122 is depicted in FIG. 1 as being within processing circuitry 120, embodiments are not so limited. In addition, although peak determination logic 124 and additional logic 126 are depicted as being a logic of analytical services logic 122, embodiments are not so limited, as peak determination logic 124 and additional logic 126 may be separate logics and/or may not be stand-alone logics but, rather, a part of analytical services logic 122. For example, analytical services logic 122, and/or any component thereof, may be located within an accelerator, a processor core, an interface, an individual processor die, implemented entirely as a software application (for instance, analytical services application 140) and/or the like.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Memory unit 130 may store an analytical services application 140 that may operate, alone or in combination with analytical services logic 122, to perform various analytical functions according to some embodiments. In various embodiments, analytical services application 140 may interact with analytical devices 115a-n and/or components thereof through various drivers (which may include application programming interfaces (APIs) and/or the like), software and/or hardware interfaces, and/or the like. In various embodiments, peak determination logic 124 may operate to determine or detect peaks in real-time or substantially real-time that may be executed via the analytical device 115a-n, which may be a mass analysis system. As will be further described below, the peak determination logic 124 may include, be coupled to, or otherwise associated with one or more processing devices, including, without limitation, graphics processing units (GPUs). In exemplary embodiments, any information (data, instructions, code, etc.) related to peak determination may be stored as peak-related information 132. In some embodiments, peak determination logic 124 may be or may include an editor application operative to allow a user and/or analytical services application 140 to perform peak determination. In various embodiments, peak-related information 132 may include, without limitation, peak detections, peak lists, data related to peak properties, chromatograms, spectra, charts, graphs, etc., as will be further described below.

In various embodiments, additional logic 126 may operate to perform various processes associated with peak determination according to some embodiments including, without limitation, auto-thresholding, on-the-fly determination of chromatographic peak width, noise reduction, etc. via the analytical device 115a-n. For example, additional logic 126 may receive additional information 134 (e.g., information associated with auto-thresholding, on-the-fly determination of chromatographic peak width, noise reduction, etc.), which may include, for example, mass, drift time, retention time, retention time slices or scans, m/z values, and other values related to auto-thresholding, on-the-fly determination of chromatographic peak width, noise reduction, and/or the like.

Figure 2:
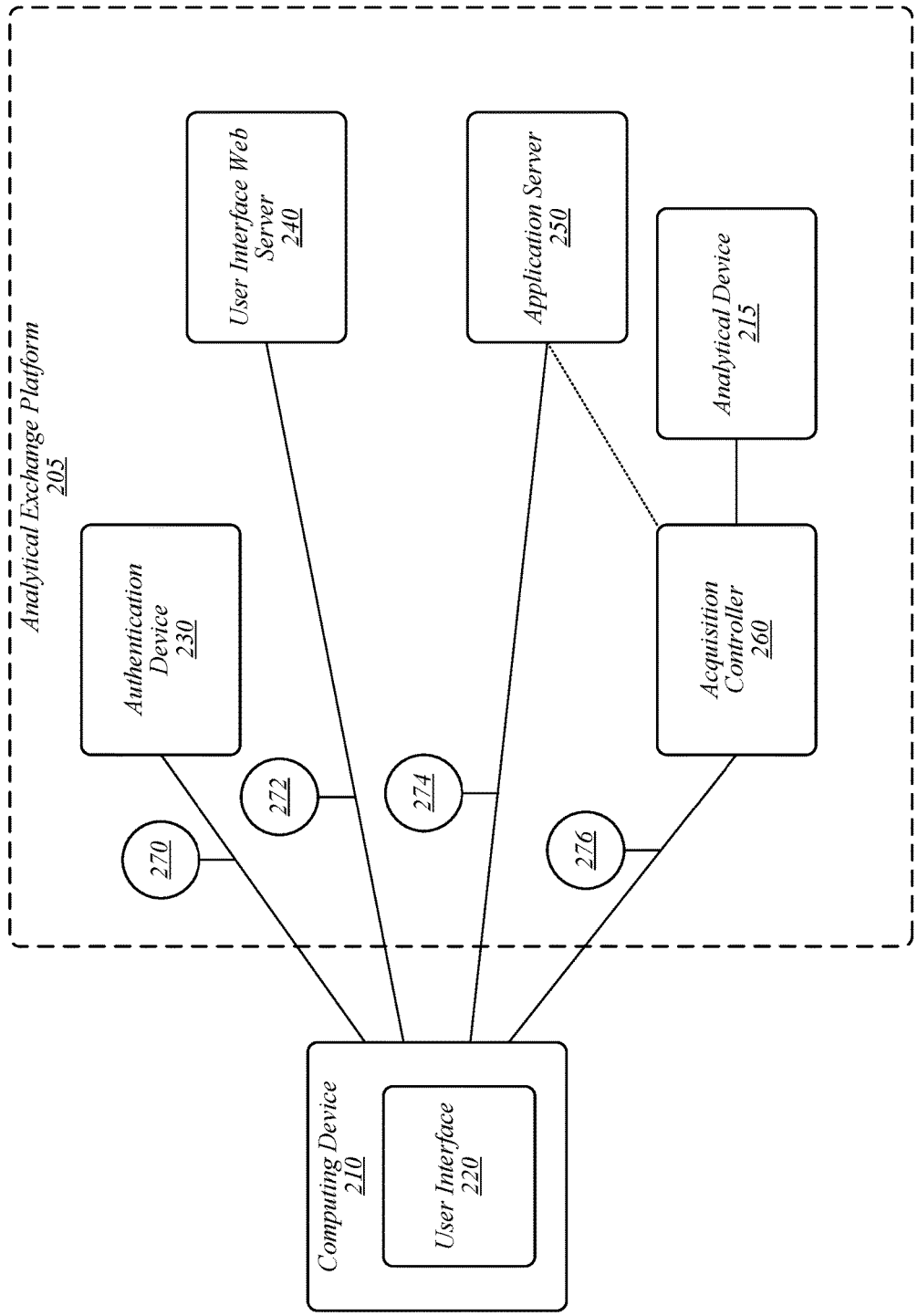
FIG. 2 illustrates a second operating environment in accordance with one or more embodiments.

FIG. 2 illustrates an example of an operating environment 200 that may be representative of some embodiments. As shown in FIG. 2, operating environment 200 may include an analytical exchange platform (or an analytical instrument platform) 205. In some embodiments, analytical exchange platform 205 may be operative to provide for the exchange of analytical information among interested entities. In various embodiments, analytical exchange platform 205. In exemplary embodiments, analytical exchange platform 205 may be or may include a software platform, suite, set of protocols, and/or the like provided to customers by a manufacturer and/or developer associated with an analytical instrument. A non-limiting example of a developer may be the Waters Corporation of Milford, Mass., United States of America. For example, a developer may provide analytical exchange platform 205 as a data exchange interface for an LC, MS, LC-MS, and/or the like analytical instrument provided to an entity by the developer.

In exemplary embodiments, operating environment 200 may include a computing device 210 operative to display user interface 220 (for instance, executed via an analytical services application 140. In some embodiments, user interface 220 may include a browser application, graphical user interfaces (GUIs), web interfaces, a mobile application ("mobile applications," "mobile apps," or "apps"), and/or the like. Embodiments are not limited in this context. In various embodiments, a user may interact with analytical exchange platform 205 and/or components thereof via user interface 220.

Authentication 270 to analytical exchange platform 205 may be implemented via an authentication device 230. In some embodiments, authentication device 230 may be or may include an identity provider in the form of a third-party entity or computing device implementing authentication services. User interface services 272 may be provided via a user interface web server 240. For example, some or all of the information, objects, and/or the like presented via user interface 220 may be provided via user interface web server 240. In various embodiments, user interface web server 240 may be the user's entry point and interface into the analytical exchange platform 205.

In various embodiments, business logic services 274 may be provided to computing device 210 via an application server 250. In general, business logic services 274 may include database access and services, workflow services, and/or the like. In various embodiments, analytical services application 140 may be executed by application server 250. For example, a server version of analytical services application 140 may be executed by application server 250 and a corresponding client analytical services application 140 may be executed on computing device 210. In some embodiments, a client application may be or may include a web application ("web app" or "app"), remote web client, thin client, and/or the like.

In some embodiments, application server 250 may be operably coupled to acquisition controller 260 to access data generated by analytical device 215. In various embodiments, acquisition controller 260 may operate to send information, events, and/or the like to user interface 220 (for instance, via application server 250) for real-time or substantially real-time monitoring and status updates. In various embodiments, acquisition controller 260 may operate to manage the acquisition of data by analytical device 215 (for instance, via an analytical services application). Embodiments are not limited in this context.

In various embodiments, user interface 220 may provide for certain functionality to implement the methodologies of the analytical services application 140. For example, from user interface 220 a user may be notified when data is invalid. In various embodiments, the user interface 220 may provide real-time or substantially real-time peak data or other related data, such as data related to various processes associated with peak determination according to some embodiments including, without limitation, auto-thresholding, on-the-fly determination of chromatographic peak width, noise reduction, etc. In examples, the user interface may allow the user to interact with analytical device 215 and/or the like to modify, delete, add, save, simulate, etc. variables, information, data, and/or the like.

Figure 3:
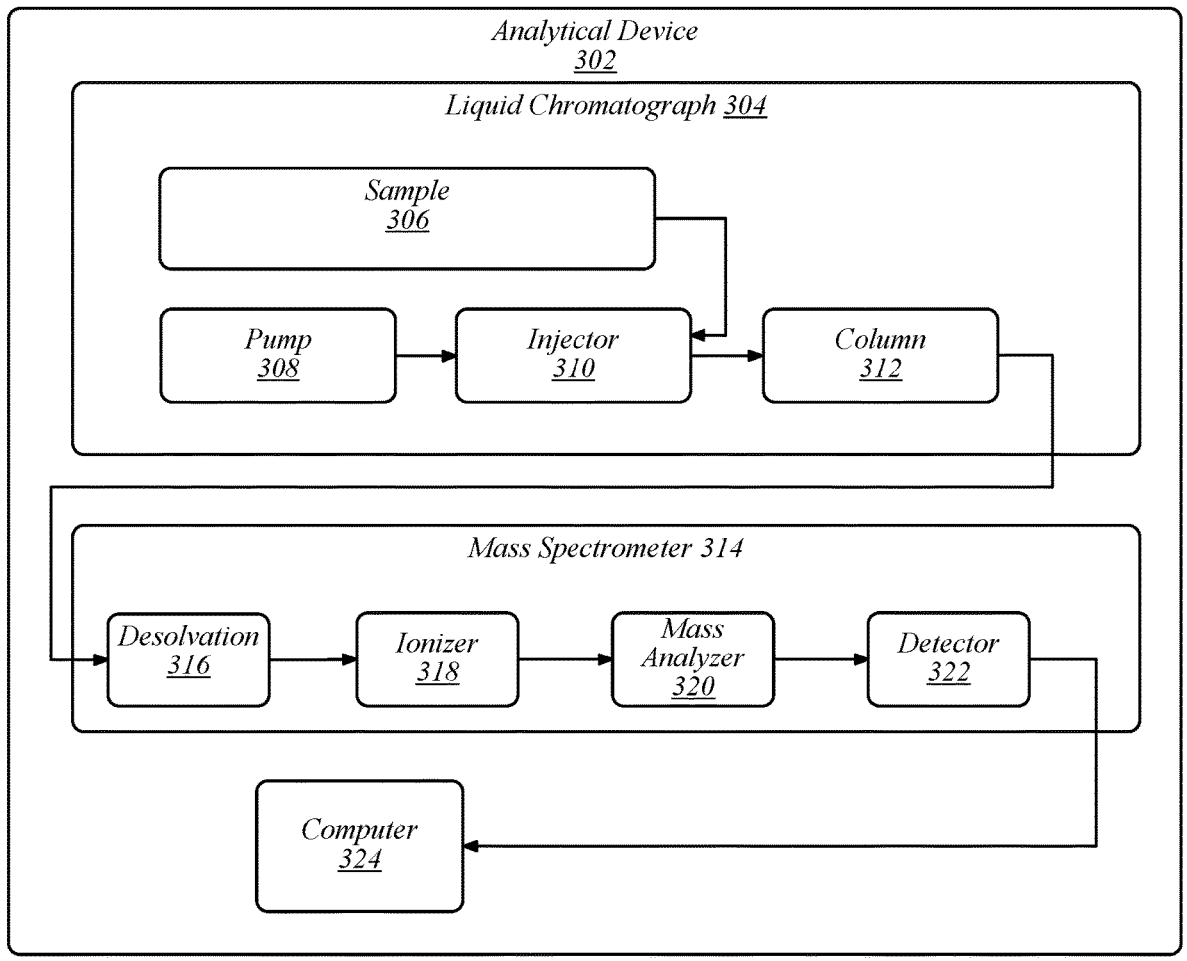
FIG. 3 illustrate a first analytical device in accordance with one or more embodiments.

FIG. 3 illustrates an example analytical device 302 (which may otherwise be referred to as an analytical instrument) that may be representative of some embodiments. The analytical device 302 may be a mass analysis system, such as an LC-MS system. It may be understood that while the analytical device 302 is an LC-MS system, it may not be limited thereto and may be, for example, an atmospheric ionization MS system, which may not use LC. LC-MS analysis may be performed by automatically or manually injecting a sample 306 into a liquid chromatograph 304. A high pressure stream of chromatographic solvent provided by pump 308 and injector 310 may force the sample 306 to migrate through a chromatographic column 312, which may include a packed column of silica beads whose surface comprises bonded molecules. Competitive interactions between the molecular species in the sample, the solvent and the beads may determine the migration velocity of each molecular species.

A molecular species migrates through column 312 and emerges, or elutes, from column 312 at a characteristic time. This characteristic time may be referred to as the retention time of the molecule. Once the molecule elutes from column 312, it can be conveyed to a detector, such as MS 314.

In the LC-MS system, the chromatographic eluent is introduced into the MS 314 for analysis, as shown in FIG. 3. MS 314 includes a desolvation system 316, an ionizer 318, a mass analyzer 320, and a detector 322. A computer 324 or any other suitable computing device may be connected or coupled to the detector 322. When the sample is introduced into MS 314, the desolvation system 316 removes the solvent. The ionizer 318 then ionizes the analyte molecules. Ionization methods to ionize molecules may include electron-impact (EI), electrospray (ES), atmospheric chemical ionization (APCI), etc. The ionized molecules may be then conveyed to mass analyzer 320, which may sort or filter the molecules by their mass-to-charge ratio. Mass analyzers, such as mass analyzer 320 used to analyze ionized molecules in MS 314, may include quadrupole mass analyzers (Q), time-of-flight (TOF) mass analyzers, Fourier-transform-based mass spectrometers (FTMS), and/or the like.

Mass analyzers may be placed in tandem in a variety of configurations, including, e.g., quadrupole time-of-flight (Q-TOF) mass analyzers. A tandem configuration enables on-line collision modification and analysis of an already mass-analyzed molecule. For example, in triple quadrupole based massed analyzers (e.g., Q1-Q2-Q3 or Q1-Q2-TOF mass analyzers), the second quadrupole (Q2), imports accelerating voltages to the ions separated by the first quadrupole (Q1). These ions, collide with a gas expressly introduced into Q2. The ions fragment as a result of these collisions. Those fragments are further analyzed by the third quadrupole (Q3) or by the TOF. Embodiments and/or examples described herein may be applicable to spectra and chromatograms obtained from any mode of mass-analysis such as those described above.

Molecules at each value for m/z are then detected with detector 322. For example, ion detection devices include current measuring electrometers and single ion counting multi-channel plates (MCPs). The signal from an MCP may be analyzed by a discriminator followed by a time-to-digital converter (TDC) or by an analog-to-digital converter (ADC). As a result, for instance, detector response may be represented by a specific number of counts, which may be proportional to the intensity of ions detected at each mass-to-charge-ratio interval.

Accordingly, the analytical device 302 outputs a series of spectra or scans collected over time. A mass-to-charge spectrum may be intensity plotted as a function of m/z. Each element, a single (or range of) mass-to-charge ratio, of a spectrum is referred to as a channel. Viewing a single channel over time provides a chromatogram for the corresponding mass-to-charge ratio. The generated mass-to-charge spectra or scans may be acquired and recorded at least by computer 324 and stored in a storage medium or memory accessible to the computer 324. In examples, a spectrum or chromatogram is recorded as an array of values and stored by computer system 324. The array may be displayed and processed, e.g., mathematically analyzed.

It may be understood that the analytical device 302, e.g., LC-MS system, and the components thereof are not limited to what is illustrated in FIG. 3. The analytical device 302 may include various other components that perform numerous LC-MS-related function, processing, analyses, and the like. Moreover, it may be understood that the analytical device 302 may be configured to perform other suitable types of analyses and perform various other types of processing in addition to LC-MS.

In embodiments, after chromatographic separation and ion detection and recordation, the data may be analyzed using a post-separation data analysis system (DAS). For example, the DAS may perform analysis in real-time or substantially real-time or near real-time or substantially real-time. The DAS may be implemented by computer software executing on a computer such as computer 324. The DAS may be configured to perform a number of tasks, including providing visual displays of the spectra and/or chromatograms as well as providing tools for performing mathematical analysis on the data. The analyses provided by the DAS include analyzing the results obtained from a single injection and/or the results obtained from a set of injections to be viewed and further analyzed. Examples of processing or analyses applied to a sample set include the production of calibration curves for analytes of interest, and the detection of novel compounds.

Figure 4:
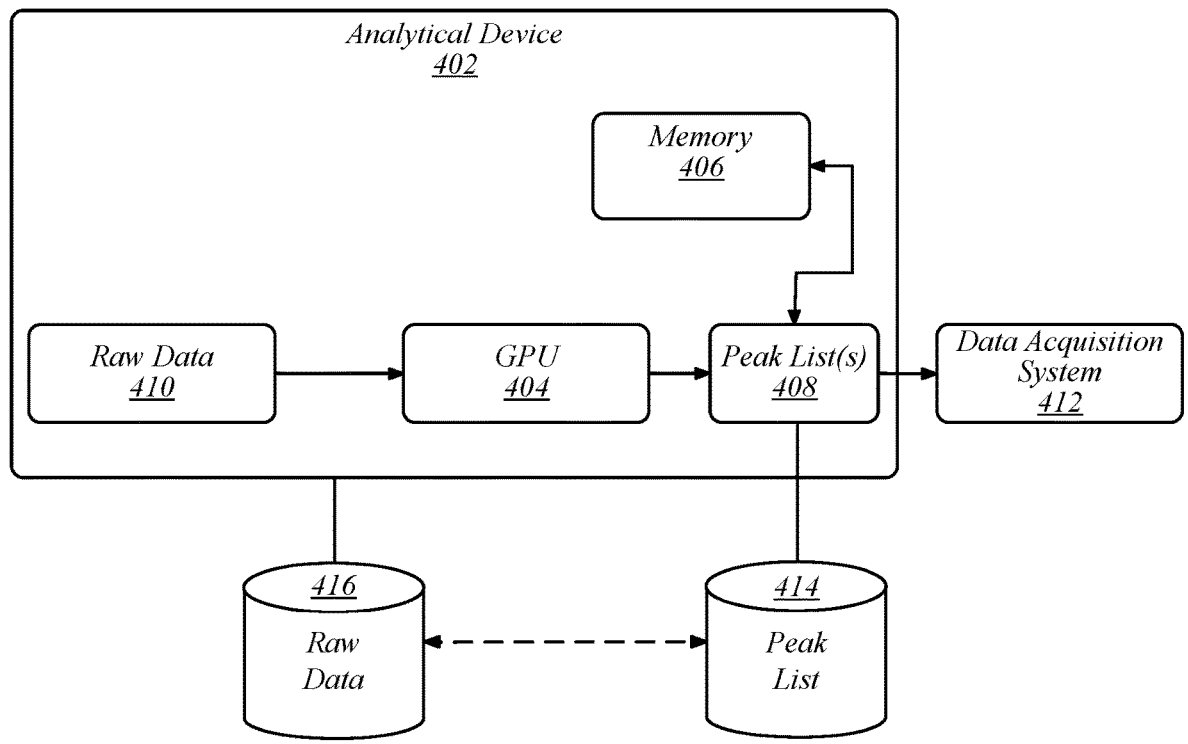
FIG. 4 illustrates a second analytical device in accordance with one or more embodiments.

FIG. 4 illustrates example processing components in an analytical device 402 that may be representative of some embodiments. The analytical device 402 may be an LC-MS system and be similar or identical to the analytical device 302 of FIG. 3. Again, it may be understood that while the analytical device 402 is an LC-MS system, it may not be limited thereto and may be, for example, an atmospheric ionization MS system, which may not use LC.

As shown, the analytical device 402 includes one or more parallel processors, such as graphics processing units (GPUs) 404 or other types of processors (e.g., CPUs, multicore CPUs, field programmable gate arrays, etc.), and memory 406. The memory 406 may have code stored thereon which, when executed using the GPU(s) 404 or other suitable types of processing unit(s), performs processing on LC-MS related data for peak detection, which may be used to generate one or more peak lists 408. It may be understood that peak detection may refer to the detection of peaks in one or more dimensions, the precise measurement of their location, peak shape, asymmetry, and the volume and mapping of the measurements in useable or meaningful units, e.g., m/z, number of ions, etc. Data indicative of the results of such peak detection may be used to generate the one or more peak lists 408.

By way of example, a peak may be identified by providing coordinates of the apex of the peak in terms of retention time, m/z, and/or intensity. One or more non-limiting examples of the processing to generate peak lists utilizing GPUs is described in U.S. patent application Ser. No. 13/702,169. For example, the GPUs may process one or more scans of LC-MS related data and may identify all peak apices in the scanned data, and based on the application of peak detection algorithms or the like, one or more peaks may be detected in real-time or substantially real-time, which may be included in a peak list, e.g., peak list 408. The peak list may also include one or more measurements related to the peak shape, asymmetry thereof, etc. Such processing on analytical device 402 may further adjust raw data 410 and/or peak list data 408 to calibrate mass data and correct for instrument drift (e.g., by detecting ambient conditions or performance characteristics of the analytical device 402 and adjusting data based on known or fixed calibration data), instrument or detector saturation (e.g., by adjusting outlying mass measurements caused by too many ions being detected by the detector during a period of time, which reduces the mass measurement accuracy and precision of the analytical device 402), detector ringing (e.g., by filtering out substantially symmetrical side bands of decreasing intensity that are distributed around a main peak of significant intensity), and/or dynamic range expansion effects (e.g., by removing errant peaks produced by application of the dynamic range enhancement applied to mass spectrometry ("DREAMS") approach).

In embodiments, raw data 410 produced during or after (as output) performing mass analysis (such as with the LC-MS system) may be analyzed in real-time or substantially real-time to generate the peak list 408. The peak list 408 may be accessed by and/or provided to a data acquisition system 412, as shown, which will be further described below. For example, a module (e.g., an API) that may be incorporated (programmatically or otherwise) in the data acquisition system 412 may advantageously allow a user to obtain the peak list 408 in real-time or substantially real-time, as the analytical device and the components therein are processing the raw mass analysis related data (scanned or otherwise) and providing it into the pipeline of the data acquisition system 412. Moreover, the peak list 408 may be stored in database 414. Additionally, other types of data, including peak list 408 or other peak lists, may be stored in database 416. As shown, the databases 414 and 416 may be connected to and communicate with each other. It may be understood that in a real-time or substantially real-time implementation, one or more processors may combine more than one peak list as they are produced. For instance, if a single instrument produces technical replicates in triplicates, the final result may appear in real-time during the acquisition of e.g., a third injection. In another instance, if there are three instruments that are running in parallel, a composite peak list may be obtained in real-time or substantially real-time.

It may also be understood that the raw data 410 is not required to be stored on permanent or non-volatile storage. The raw data 410, e.g., MS-LC related data, may be stored temporarily, such as in a form of memory or volatile storage, for the duration of time during which such data is needed for peak list detection and computation processing. In some examples, after such processing, the data may be discarded. Thus, the analytical device 402 may include computer executable instructions (e.g., code) or the like for performing peak list generation in real-time or substantially real-time that produces as a final output the peak list rather than the raw LC-MS scan data. In some examples, the raw data, however, may also be stored in storage device, databases, etc., e.g., databases 414, 416.

It may also be understood that both the one or more GPUs 404 and/or one or more CPUs may be included in the same system. For example, programmable code or executable instructions that executes in the GPU may be programmed or implemented, for example, using "CUDA" programming language designed to exploit parallel processing characteristics of the GPU. It may be understood that the one or more GPUs 404 may implement any type of parallel computing platform and application programming interface and may not be limited to just a CUDA implementation. The GPU may handle numerous concurrent programming threads, each running one or more elements of a parallel computation. To facilitate parallel programming, CUDA may organize these threads in blocks, and the threads blocks are organized in a grid. The threads in a thread block can be indexed in one, two, or three dimensions, and the grid can be indexed in one, two, or three dimensions. For example, the function calls that run in the GPU are called "kernels," and may be launched from the one or more CPUs. Each kernel corresponds to a portion of parallel code that may be executed by multiple threads, where such threads are organized into a number of blocks. A "grid" of thread blocks executing the same kernel code, may be run as a unit of computation on the GPU where, depending on the GPU resources, some or all threads in the grid are executed concurrently.

Figure 5:
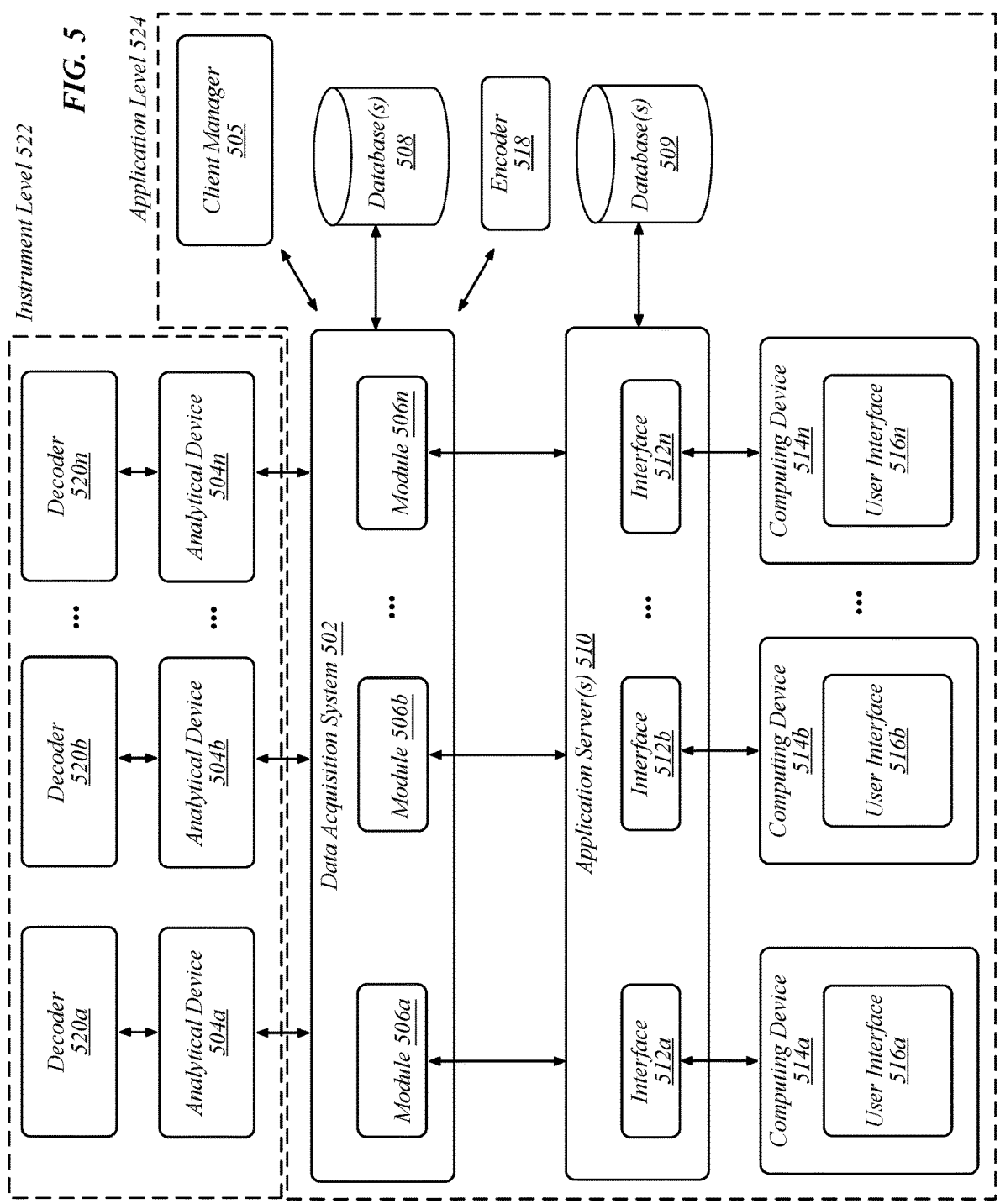
FIG. 5 illustrates a third operating environment in accordance with one or more embodiments.

FIG. 5 illustrates one or more modules programmatically implemented in an example data acquisition system 502 that may be representative of some embodiments. The data acquisition system 502 may be similar or identical to the data acquisition system 412 shown in FIG. 4. As illustrated, one or more analytical devices, e.g., analytical devices 504*a-n*, may interface with the data acquisition system 502. As described above, the one or more analytical devices may be an LC-MS system. The analytical devices 504*a-n* may be connected to the data acquisition system 502, where data (e.g., raw mass analysis related data 410, peak list data 408) from the analytical devices can be streamed and stored (such as in one or more databases 508). Moreover, a client manager 505 may be connected to the data acquisition system 502 that may programmatically interface with the data acquisition system 502. In examples, the client manager 505 may receive processed scan data from the data acquisition pipeline 502, including peak detections.

As further shown in FIG. 5, the data acquisition system 502 may include one or more modules, e.g., modules 506*a-n* (which may be hard coded, a plug-in extension, or otherwise), each of which may correspond to the analytical devices 504*a-n*. The modules may be APIs that allow external components or interfaces to communicate with or access various data from the one or more analytical devices 504*a-n* in real-time or substantially real-time, such as peak detections, peak lists, data related to peak properties, etc., as will be further described below. An external component or interface may be one or more application servers 510, which allow one or more computing devices, e.g., computing devices 514*a-n*, to interface (programmatically or otherwise) with the one or more application servers 510 (and with the data acquisition system 502 and ultimately with the analytical devices 504*a-n*) via interfaces 512*a-n*. Thus, for example, a user may be able to receive, view, and/or interact with real-time or substantially real-time data, processing, and/or analysis, e.g., peak detection data, peak list, provided by the analytical devices 504*a-n*, on the user interfaces 516*a-n* of the computing devices 514*a-n*, respectively. In at least that regard, the modules 506*a-n* may provide real-time or substantially real-time access to instrument-related data, e.g., peak list, that may be processed and generated by the instrument and its components, e.g., GPUs. In examples, the user may have the choice as to whether real-time or substantially real-time peak detection or other real-time or substantially real-time processing is performed and how that may be done, which may be specified, for example, on the user interfaces 516*a-n*.

In embodiments, the modules 506*a-n* may be hosted by a processor plug-in in the data acquisition system 502 (and/or in an external computing device) and may interface with or access one or more components of the analytical device, such as the one more GPUs by way of a CUDA implementation and/or by way of any non-CUDA implementation, as described above. The modules 506*a-n* may be APIs configured or programmed to perform real-time or substantially real-time peak detection (including different modes of real-time or substantially real-time peak detections such as chromatographic and scan by scan peak detection), auto-thresholding, filtering based on an isotope model, application of a mass sufficiency filter, on-the-fly determination of chromatographic peak width, noise reduction, etc., all of which can be output as a new "raw" data file format where the data is centroided, corrected for at least lock mass, calibration, instrumental noise, saturation, and/or ringing. The data file size of this new data file format may be reduced in size on multiple orders of magnitude compared to the streamed data (which may flow from the analytical devices 504*a-n* to the data acquisition system 502) in the data acquisition system 502. Thus, in examples, the real-time or substantially real-time processing performed by the modules 506*a-n* is effectively moved "closer" to the instrument or the analytical device(s) 504*a-n* in instrument level 522, while still being part of or kept "inside" the application level 524. In other examples, the real-time or substantially real-time processing performed by the modules 506*a-n*, may be instead performed by analytical devices 504*a-n*, and thus, effectively moved "into" the instrument level 522.

It may be understood that chromatographic peak detection may refer to the inclusion of chromatographic dimension in the peak detection, which may be two-dimensional (e.g., mass and retention time) where no mobility data is present, or may be three-dimensional (e.g., mass, drift time, and retention time) where mobility data is present. Moreover, it may be understood that scan by scan peak detection may refer to a process in which each retention time slice or scan is processed independently of the other slices or scans, which may be a one dimensional peak, e.g., detection of a mass spectral peak, or may be two-dimensional, e.g., detection of peaks in both m/z and drift time. Such scan by scan peak detection data may then be followed by a post-processing step to produce chromatographic peak detection peak list(s) 408.

According to further embodiments, there may be various parameters associated with performing real-time or substantially real-time peak detection (or post-processing thereof) by the one or more modules. For example, the modules 506a-n may survey the entirety of the acquired mass analysis related data to identify suitable peak widths in setting appropriate convolution filter coefficients. These parameters may be supplied or determined on the fly. Moreover, in the data acquisition system 502, for example, mass spectral and drift peak widths may be measured during calibration and so may be available to the modules 506a-n to process, along with the detector average single ion response, which may be used to estimate noise levels. In further examples, the peak detection threshold may be provided by the user.

According to further embodiments, the data acquisition system 502 or application server(s) 510 may include encoder 518, which gathers correction information used by analytical device(s) 504a-n to perform instrument-related or analytical-device-related processing, such as instrument calibrations, lock-mass information, and/or peak detections. In these instances, encoder 518 may be coupled (programmatically or otherwise) to one or more decoder(s) 520a-n, which is/are operatively coupled with one or more analytical devices 504a-n. Correction information provided from encoder 518 to decoder(s) 520a-n may then be applied to the instrument-level processing on the one or more analytical devices 402 to, e.g., correct for instrument drift, instrument saturation, detector ringing, and/or DRE effects. Providing correction information from the application-level processing may reduce redundancy and improve economy in terms of data storage.

The following settings or parameters in the below table, Table 1, may be used by the modules 506a-n to perform the real-time or substantially real-time peak detections or any post-processing steps. It may be understood that the parameters or settings recited in the following Table 1 is an example and are not limited thereto.

TABLE 1

| Parameter Name | Values | Description |
| --- | --- | --- |
| PeakDetectionMode | 0, 1, 2 | This parameter may switch the type of peak detection to be performed: 0 - None, 1 - Scan by scan, and 2 - Chromatographic |
| PeakDetectionThreshold | Greater than or equal to zero | The detection threshold may be expressed in ion counts. Alternatively, an automatic predetermined threshold may be set. |
| PeakDetectionChromWidth | Greater than zero | The chromatographic peak width may be expressed in seconds. Alternatively, an automatic width may be determined on the fly. |
| PeakDetectionDriftOffset | Greater than or equal to zero | The drift peak width may be in milliseconds at the start of the drift time range. This parameter may override the value measured during instrument calibration and may allow appropriate values to be set for canned data. |
| PeakDetectionDriftGradient | Greater than or equal to zero | The rate of increase of drift peak width. This parameter may override the value measured during instrument calibration and allows appropriate values to be set for canned data. |
| PeakDetectionW0 | Greater than or equal to zero | The MS peak width at flight time zero may be expressed in time bins. This parameter may override the value measured during instrument calibration and allows appropriate values to be set for canned data. |
| PeakDetectionW1 | Greater than or equal to zero | The rate of increase of MS peak width (may be 1/(2R) where R is the mass resolution). This parameter may override the value measured during instrument calibration and allows appropriate values to be set for canned data. |
| PeakDetectionSingleIonResponse | Greater than zero | This may be the average detector response for a single ion arrival. This parameter may override the value measured during instrument calibration and allows appropriate values to be set for canned data. |

As described above, the output of the real-time or substantially real-time peak detection by the one or more modules 506a-n may be a peak list, which may be saved to a specific local memory, such as the local memory of the analytical device. In examples, the m/z values in the peak list may be lock-mass corrected. In further examples, the output may be written as Protocol Buffers messages with each isolated message pre-pended by its size in bytes. One stream may be written for reach peak detected function (including the lock-mass function) along with an additional stream for mass calibration and processed lock-mass information. The streams may be written in binary files, which can be read and decoded by a separate application (e.g., a decoder interface of a codec) that can apply MS calibration and lock-mass correction along with any drift time adjustments. Thus, according to embodiments, the decoder interface of the codec may define the requests the separate application can make on the processed MS data, such as the peak list, and this may determine the information that must be provided to the encoder interface of the codec so that the encoder can write the metadata or code to perform such requests.

One of the many benefits and advantages of the output of the real-time or substantially real-time peak detection process, e.g., peak list, is that the data size of the output (or format thereof) may be significantly reduced. Thus, raw continuum data in the data acquisition system does not have to be inspected, stored, or processed, in its entirety, to acquire the peak list. Moreover, the availability of pre-prepared peak lists may significantly reduce processing burdens or other types of burdens on the application server(s) 510, databases 508, 509, and at least the network shown in FIG. 5. Thus, in examples, the one or more application servers 510 may handle only post-peak-detection processing.

Yet another advantage of the module configuration, for instance, is the uniformity of processing. By way of example, any processing performed by the application server(s) 510 or any of the computing devices 514a-n on a peak list provided by analytical device 504a (via module 506a) is going to be on that same peak list. Thus, at least the peak data in the peak list will be consistently applied throughout. Moreover, a further advantage is that performance of the overall testing process is increased. By way of another example, real-time or substantially real-time peak detection and peak list generation from analytical device 504a (via module 506a) allows a user operating from, for example, computing device 514a to make adjustments to the analytical device 504a on the fly, as opposed to waiting a long duration of time for post-acquisition processing to complete in the data acquisition system to obtain a peak list or peak detection data, which may render the adjustment of the analytical device 504a untimely or moot.

It may be understood that the functionality described for application level 524 may take place on one or more physically separate devices. For example, the functionality described for data acquisition system 502 may be performed on a personal computer (PC), server, tablet computing device, cloud computing device, and/or the like, while the functionality described for application server(s) 510 may be performed on similar but separate devices operatively connected to data acquisition system 502. Likewise, the functionality described for computing device(s) 514a-n may similarly be performed on similar but separate devices operatively connected to application server(s) 510.

Included herein are one or more logic flows representative of exemplary methodologies for performing novel aspects of the disclosed embodiments. While, for purposes of simplicity of explanation, the one or more methodologies shown herein are shown and described as a series of acts, those skilled in the art will understand and appreciate that the methodologies are not limited by the order of acts. Some acts, steps, and/or the like may, in accordance therewith, occur in a different order and/or concurrently with other acts from that shown and described herein. In addition, certain acts, steps, and/or the like may be excluded. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 6:
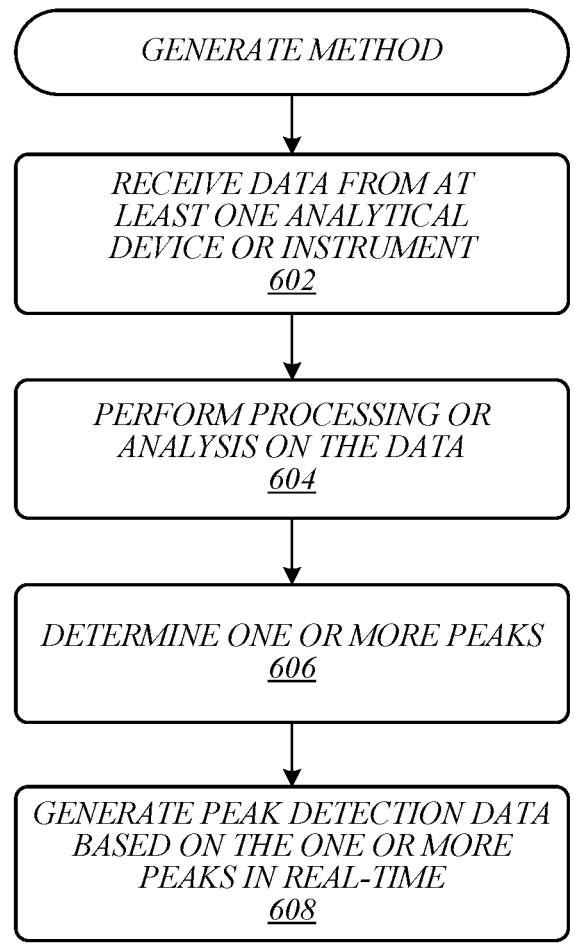
FIG. 6 illustrates a logic flow in accordance with one or more embodiments.

FIG. 6 illustrates an embodiment of a logic flow 600. Logic flow 600 may be representative of some or all of the operations executed by one or more embodiments described herein, such as computing device. In some embodiments, logic flow 600 may be representative of some or all of the operations of a method generation process. Moreover, it may be understood that the blocks illustrated in the logic flow 600 do not have to be performed in any specific order.

At block 602, data from at least one analytical device or instrument may be received. As described above, the analytical device or instrument may be an MS system or an LC-MS system. The data may be raw continuum data produced as a result of the MS or LC-MS related processing or analysis performed on a sample.

At block 604, processing or analysis may be performed on the raw continuum data. For example, the processing or analysis may include peak detection and various other processes associated with peak determination according to some embodiments including, without limitation, auto-thresholding, on-the-fly determination of chromatographic peak width, noise reduction, etc., and/or any other suitable MS or LC-MS related types of processing or analysis.

At block 606, one or more peaks may be determined based on the processing or analysis performed at block 604. As described above, the one or more peaks may be determined by one or more GPUs. The determination, for example, may be based on one or more peak detection algorithms and one or more variables or parameters either automatically determined or input by a user, such as peak threshold values and the like.

At block 608, once the one or more peaks are determined, peak detection data may be generated and provided in real-time or substantially real-time. In examples, the peak detection data may include one or more peak lists. The peak detection data may be output and made accessible to external components (hardware, software, or otherwise), such as one or more modules (e.g., APIs) that may be programmatically implemented in a data acquisition system. As described above, in examples, the one or more modules may be hosted by the CPUs and/or GPUs of the analytical devices or instruments. The size of the output data may be significantly reduced compared to the size of the raw continuum data at block 602. Moreover, the peak detection data may be centroided and/or corrected for lock mass, calibration, instrumental noise, saturation, drift, and/or ringing.

Figure 7:
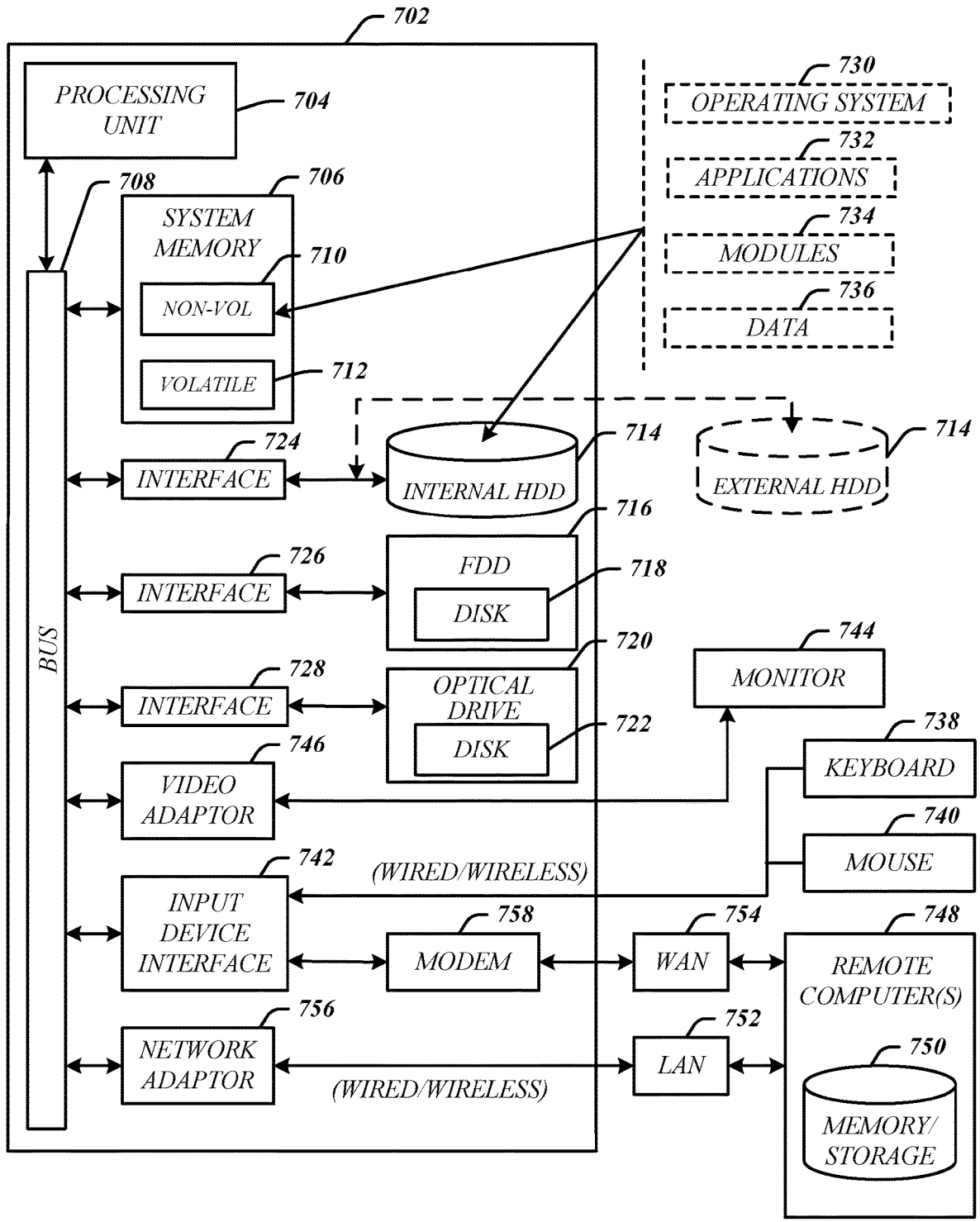
FIG. 7 illustrates a computing architecture in accordance with one or more embodiments.

FIG. 7 illustrates an embodiment of an exemplary computing architecture 700 suitable for implementing various embodiments as previously described. In various embodiments, the computing architecture 700 may comprise or be implemented as part of an electronic device. In some embodiments, the computing architecture 700 may at least partially be representative, for example, of computing devices 110, 210, 514a-n, computer 324, analytical devices 115j-n, 402, 504a-n, or any other device or component capable of storing or processing data discussed herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 704.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by an HDD interface 724, an FDD interface 726 and an optical drive interface 728, respectively. The HDD interface 724 for external drive implementations can include at least one or both of Universal Serial Bus (USB) and IEEE 1374 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system, comprising:
   at least one analytical instrument;
   at least one first computing device connected to or comprised in the at least one analytical instrument;
   a data acquisition system programmatically interfaced with the at least first computing device; and
   at least one second computing device programmatically interfaced with the data acquisition system,
   wherein the at least one first computing device comprises:
   at least one memory; and
   logic coupled to the at least one memory, the logic configured to:
   receive data from the at least one analytical instrument;
   perform processing or analysis on the received data;
   determine one or more peaks based on the processing or the analysis of the received data; and
   generate, in real-time or substantially real-time, peak detection data based on the detected one or more peaks, the logic configured to generate the peak detection data at one or more modules programmatically integrated into the data acquisition system, wherein the one or more modules are application programming interfaces (APIs).

2. The system of claim 1, wherein the at least one analytical instrument comprises one or more of the following: a liquid chromatography (LC) system, a gas chromatography (GC) system, a mass analyzer system, a mass spectrometer (MS) system, an ion mobility spectrometer (IMS) system, a high-performance liquid chromatography (HPLC) system, an ultra-performance liquid chromatography system, and an ultra-high performance liquid chromatography (UHPLC) system.

3. The system of claim 1, wherein the at least one analytical device comprises a mass spectrometry (MS) system or a liquid chromatography-mass spectrometry (LC-MS) system.

4. The system of claim 3, wherein the data from the at least one analytical instrument is associated with MS or LC-MS analysis performed on a sample.

5. The system of claim 1, wherein the peak detection data includes one or more peak lists.

6. The system of claim 1, wherein the peak detection data is centroided and/or corrected for lock mass, calibration, instrumental noise, saturation, and/or ringing.

7. The system of claim 6, wherein the correction for lock mass, calibration, instrumental noise, saturation, and/or ringing is performed by a codec.

8. The system of claim 1, wherein the determination of the one or more peaks comprises a scan by scan peak detection and/or a chromatographic peak detection.

9. The system of claim 1, the logic configured to perform auto-thresholding and/or determine chromatographic peak width and/or noise reduction.

10. The system of claim 5, wherein a size of the peak detection data is smaller than the data from the at least one analytical instrument.

11. The system of claim 1, wherein the at least second computing device is an application server computing device configured to connect one or more user computing devices, wherein the user computing devices are configured to access the one or more peak lists in real-time or substantially real-time.

12. The system of claim 1, wherein the logic is a central processing unit (CPU) and/or a graphics processing unit (GPU).

13. A method, comprising:
receiving data from at least one analytical instrument at a data acquisition system;
performing processing or analysis on the received data;
determining, via one or more processing units and/or one or more graphics processing units (GPUs), one or more peaks based on the processing or the analysis of the received data; and
generating, in real-time or substantially real-time, peak detection data based on the detected one or more peaks, the peak detection data generated at one or more modules programmatically integrated into the data acquisition system, wherein the one or more modules are application programming interfaces (APIs).

14. The method of claim 13, wherein the at least one analytical instrument comprises one or more of the following: a liquid chromatography (LC) system, a gas chromatography (GC) system, a mass analyzer system, a mass spectrometer (MS) system, an ion mobility spectrometer (IMS) system, a high-performance liquid chromatography (HPLC) system, an ultra-performance liquid chromatography system, and an ultra-high performance liquid chromatography (UHPLC) system.

15. The method of claim 13, wherein the at least one analytical device comprises a mass spectrometry (MS) system or a liquid chromatography-mass spectrometry (LC-MS) system.

16. The method of claim 15, wherein the data from the at least one analytical instrument is associated with MS or LC-MS analysis performed on a sample.

17. The method of claim 13, wherein the peak detection data includes one or more peak lists.

18. The method of claim 13, wherein the peak detection data is centroided and/or corrected for lock mass, calibration, instrumental noise, saturation, and/or ringing.

19. The method of claim 13, wherein the determining of the one or more peaks comprises a scan by scan peak detection and/or a chromatographic peak detection.

20. The method of claim 13, further comprising performing auto-thresholding.

21. The method of claim 13, further comprising determining chromatographic peak width and/or noise reduction.

22. The method of claim 13, wherein a size of the peak detection data is smaller than the data from the at least one analytical instrument.

23. A non-transitory computer readable medium storing executable instructions, the executable instructions when executed by one or more processors causes the one or more processors to:
receive data from the at least one analytical instrument at a data acquisition system;
perform processing or analysis on the received data;
determine, via the one or more processors, one or more peaks based on the processing or the analysis of the received data; and
generate, in real-time or substantially real-time, peak detection data based on the detected one or more peaks, the peak detection data generated at one or more modules programmatically integrated into the data acquisition system, wherein the one or more modules are application programming interfaces (APIs).

24. The non-transitory computer readable medium of claim 23, wherein the one or more processors include a central processing unit (CPU) and/or a graphics processing unit (GPU).

25. The system of claim 5, wherein the at least one analytical instrument includes two or more separate analytical instruments configured to run in parallel, and wherein the one or more peak lists includes a composite peak list.

* * * * *